US010215109B2

(12) United States Patent
Bartsch et al.

(10) Patent No.: US 10,215,109 B2
(45) Date of Patent: Feb. 26, 2019

(54) METHOD FOR REGULATING THE CHARGE PRESSURE OF A SUPERCHARGED INTERNAL COMBUSTION ENGINE WITH AT LEAST TWO COMPRESSORS, AND INTERNAL COMBUSTION ENGINE FOR CARRYING OUT SUCH A METHOD

(71) Applicant: Ford Global Technologies, LLC, Dearborn, MI (US)

(72) Inventors: Arno Bartsch, Maastricht (NL); Benedikt Seier, Regensburg (DE); Alain Marie Roger Chevalier, Henri-Chapelle (BE); Michael Marbaix, Haillot (BE)

(73) Assignee: Ford Global Technologies, LLC, Dearborn, MI (US)

( * ) Notice: Subject to any disclaimer, the term of this patent is extended or adjusted under 35 U.S.C. 154(b) by 235 days.

(21) Appl. No.: 15/231,984

(22) Filed: Aug. 9, 2016

(65) Prior Publication Data
US 2017/0058792 A1  Mar. 2, 2017

(30) Foreign Application Priority Data

Aug. 24, 2015  (DE) .................. 10 2015 216 105

(51) Int. Cl.
*F02B 33/44* (2006.01)
*F02B 33/00* (2006.01)
*F02D 23/00* (2006.01)
(Continued)

(52) U.S. Cl.
CPC ............ *F02D 23/02* (2013.01); *F02B 37/004* (2013.01); *F02B 37/16* (2013.01); *F02B 37/168* (2013.01);
(Continued)

(58) Field of Classification Search
CPC .. F02D 23/02; F02D 41/0007; F02D 41/1401; F02D 2200/0406; F02B 37/004; F02B 37/16; F02B 37/168; F02B 37/18; F02B 37/183; F02B 37/01; F02B 37/243; Y02T 10/144
USPC ................ 60/602, 605.1, 611–612; 123/562
See application file for complete search history.

(56) References Cited

U.S. PATENT DOCUMENTS 5,063,744 A * 11/1991 Ishiyama .............. F02B 37/013
60/612
5,142,866 A * 9/1992 Yanagihara ........... F02B 37/013
60/612
(Continued)

FOREIGN PATENT DOCUMENTS

DE     102004003378 A1     8/2004
DE     102005062681 A1     7/2007
(Continued)

OTHER PUBLICATIONS

An English Translation of the reference to Sasaki (Pub. No. DE 10 2004 003 378 A1), published on Aug. 12, 2004.*

Primary Examiner — Thai Ba Trieu
(74) Attorney, Agent, or Firm — Julia Voutyras McCoy Russell LLP

(57) ABSTRACT

A method for regulating the charge pressure $p_{boost}$ of a supercharged internal combustion engine is disclosed. The method may include adjusting each of two wastegates, a variable turbine geometry, and a downstream compressor bypass valve to regulate engine boost pressure as a function of a first setpoint value for pressure between compressors and a pressure difference in a first regulation loop, a second setpoint value for pressure downstream of multiple compressors, and the pressure difference in a second regulation loop.

10 Claims, 2 Drawing Sheets

(51) Int. Cl.

| | | |
|---|---|---|
| *F02D 23/02* | (2006.01) | |
| *F02B 37/00* | (2006.01) | |
| *F02B 37/18* | (2006.01) | |
| *F02B 37/24* | (2006.01) | |
| *F02B 37/16* | (2006.01) | |
| *F02D 41/14* | (2006.01) | |
| *F02D 41/00* | (2006.01) | |

(52) U.S. Cl.
CPC ............ *F02B 37/18* (2013.01); *F02B 37/183* (2013.01); *F02B 37/24* (2013.01); *F02D 41/0007* (2013.01); *F02D 41/1401* (2013.01); *F02D 2041/1418* (2013.01); *F02D 2200/0406* (2013.01); *Y02T 10/144* (2013.01)

(56) References Cited

U.S. PATENT DOCUMENTS

| | | | |
|---|---|---|---|
| 6,112,523 A | 9/2000 | Kamo et al. | |
| 7,174,777 B2* | 2/2007 | Fischer | F02B 37/013 |
| | | | 73/114.33 |
| 7,735,320 B2 | 6/2010 | Yanakiev | |
| 7,861,580 B2* | 1/2011 | Sujan | F02B 37/013 |
| | | | 73/114.77 |
| 7,958,730 B2 | 6/2011 | Stewart | |
| 8,011,186 B2* | 9/2011 | McEwan | F02B 37/183 |
| | | | 60/602 |
| 8,468,821 B2 | 6/2013 | Liu et al. | |
| 2012/0210710 A1 | 8/2012 | Chevalier et al. | |
| 2012/0210711 A1* | 8/2012 | Petrovic | F02B 37/013 |
| | | | 60/602 |
| 2013/0306039 A1* | 11/2013 | Zagone | F02B 37/013 |
| | | | 123/562 |
| 2014/0230410 A1* | 8/2014 | Yacoub | F02B 37/168 |
| | | | 60/274 |
| 2015/0322896 A1* | 11/2015 | Arnold | F02D 41/0027 |
| | | | 123/445 |

FOREIGN PATENT DOCUMENTS

| | | |
|---|---|---|
| EP | 1640596 A1 | 3/2006 |
| EP | 1927739 A1 | 6/2008 |

* cited by examiner

METHOD FOR REGULATING THE CHARGE PRESSURE OF A SUPERCHARGED INTERNAL COMBUSTION ENGINE WITH AT LEAST TWO COMPRESSORS, AND INTERNAL COMBUSTION ENGINE FOR CARRYING OUT SUCH A METHOD

CROSS REFERENCE TO RELATED APPLICATION

This application claims priority to German Patent Application No. 102015216105.6, filed Aug. 24, 2015, the entire contents of which are hereby incorporated by reference for all purposes.

BACKGROUND AND SUMMARY

Various systems and methods are described for regulating the charge pressure $p_{boost}$ of a supercharged internal combustion engine. The engine may have at least one cylinder, and may further include an intake system for the supply of charge air to the at least one cylinder, and an exhaust-gas discharge system for the discharge of the exhaust gas from the at least one cylinder. The system may further have at least two compressors arranged in series in the intake system, of which a first compressor serves as a low-pressure stage and a second compressor serves as a high-pressure stage.

Control of such a system can be particularly challenging, especially when the second compressor is arranged downstream of the first compressor and there is a first bypass line provided which branches off from the intake system between the first compressor and the second compressor and which opens into the intake system downstream of the second compressor, where a first control element is arranged in the first bypass line. For example, control with a single pressure target via two different turbochargers in series might become difficult in an overlap RPM region (e.g., 2000-3000 rpm) where the high pressure turbocharger is losing efficiency and the low pressure turbocharger is gaining presence. A change in actuator setting on the first one might result in an effect on pressure opposite to what is targeted caused by the second one. (For example, opening of bypass to reduce boost could result in increase of pressure due to higher exhaust energy deviated from the high to low pressure turbine.

Thus, in one approach a first setpoint value for the pressure $p_{inter\text{-}stage,\,set}$ in the intake system between the first compressor and the second compressor is predefined, and the pressure $p_{inter\text{-}stage}$ in the intake system between the first compressor and the second compressor is determined. Then, using the pressure difference $\Delta p_1 = p_{inter\text{-}stage,set} - p_{inter\text{-}stage}$, in a first regulation loop, the drive power of the first compressor is varied (e.g., via a wastegate or variable geometry adjustments) in order to regulate the pressure $p_{inter\text{-}stage}$; a second setpoint value for the pressure $p_{boost,\,set}$ in the intake system downstream of the second compressor is predefined. The pressure $p_{boost}$ in the intake system downstream of the second compressor is then determined, and using the pressure difference $\Delta p_2 = p_{boost,\,set} - p_{boost}$, in a second regulation loop, the drive power of the second compressor is varied (e.g., via a wastegate) in order to regulate the pressure $p_{boost}$.

In another example, a method comprises adjusting each of two wastegates, a variable turbine geometry, and a downstream compressor bypass valve to regulate engine boost pressure as a function of a first setpoint value for pressure between compressors and a pressure difference in a first regulation loop, a second setpoint value for pressure downstream of multiple compressors, and the pressure difference in a second regulation loop.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
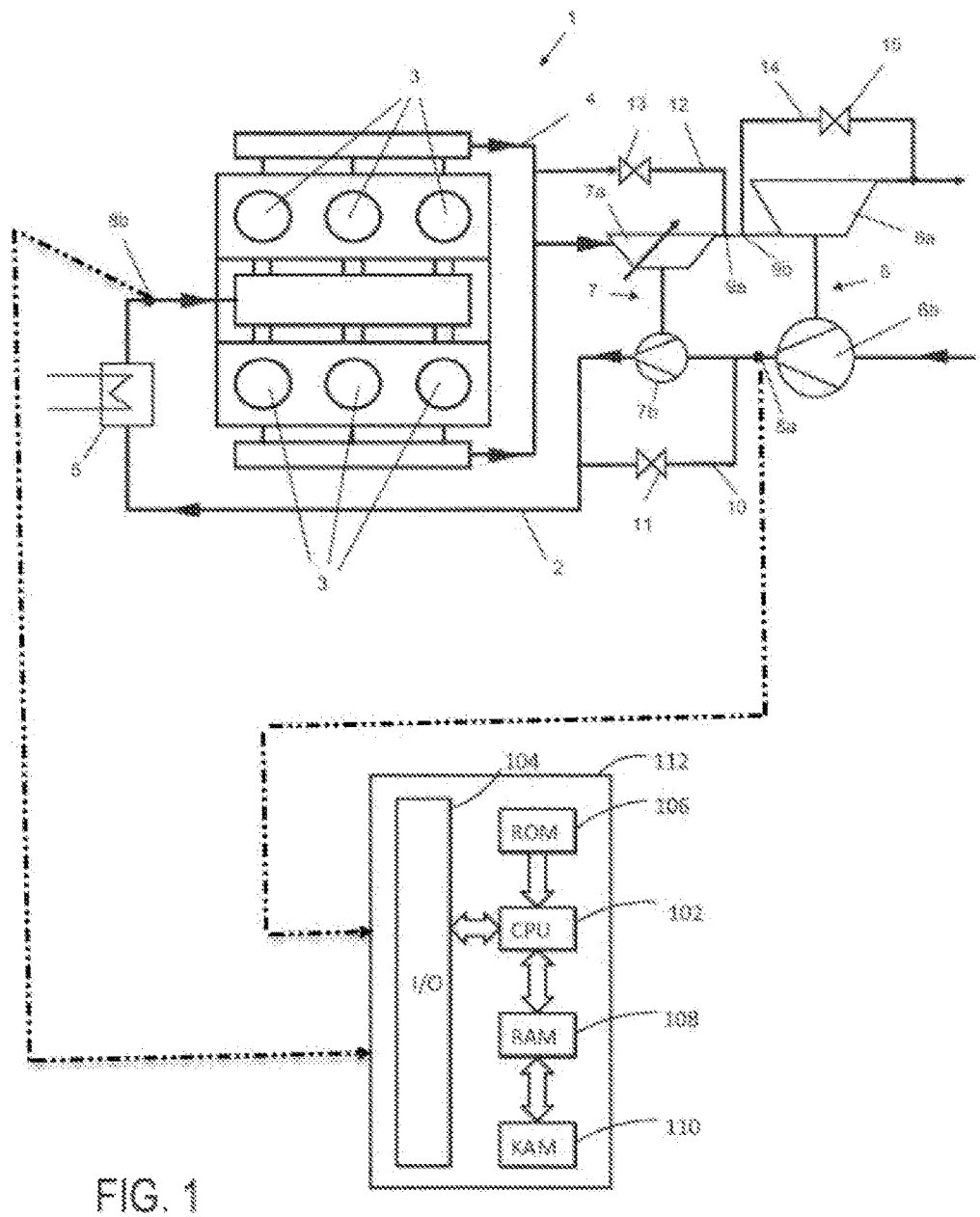
FIG. 1 schematically shows a first embodiment of the supercharged internal combustion engine.

The present application relates to a method for regulating the charge pressure $p_{boost}$ of a supercharged internal combustion engine having at least one cylinder, having an intake system for the supply of charge air to the at least one cylinder, and having an exhaust-gas discharge system for the discharge of the exhaust gas from the at least one cylinder, and having at least two compressors arranged in series in the intake system, of which a first compressor serves as a low-pressure stage and a second compressor serves as a high-pressure stage, the second compressor being arranged downstream of the first compressor, a first bypass line being provided which branches off from the intake system between the first compressor and the second compressor and which opens into the intake system downstream of the second compressor, and a first control element being arranged in the first bypass line.

The present application also relates to a supercharged internal combustion engine for carrying out such a method.

An internal combustion engine of the stated type is used as a motor vehicle drive unit. Within the context of the present application, the expression "internal combustion engine" encompasses Otto-cycle engines, diesel engines and also hybrid internal combustion engines, which utilize a hybrid combustion process.

Supercharging serves primarily to increase the power of the internal combustion engine. Here, the air required for the combustion process is compressed, as a result of which a greater air mass can be supplied to each cylinder per working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In any case, supercharging leads to an increase in volumetric power output and a more expedient power-to-weight ratio. If the swept volume is reduced, it is thus possible, given the same vehicle boundary conditions, to shift the load collective toward higher loads, at which the specific fuel consumption is lower. Supercharging of an internal combustion engine consequently assists in the efforts to minimize fuel consumption, that is to say to improve the efficiency of the internal combustion engine.

By means of a suitable transmission configuration, it is additionally possible to realize so-called downspeeding, whereby a lower specific fuel consumption is likewise achieved. In the case of downspeeding, use is made of the fact that the specific fuel consumption at low engine speeds is generally lower, in particular in the presence of relatively high loads.

With targeted configuration of the supercharging, it is also possible to obtain advantages with regard to exhaust-gas emissions. With suitable supercharging for example of a diesel engine, the nitrogen oxide emissions can therefore be reduced without any losses in efficiency. The hydrocarbon emissions can be favorably influenced at the same time. The emissions of carbon dioxide, which correlate directly with fuel consumption, likewise decrease with falling fuel consumption.

For supercharging, use is generally made of an exhaust-gas turbocharger, in which a compressor and a turbine are arranged on the same shaft. The hot exhaust-gas flow is fed to the turbine and expands in the turbine with a release of energy, as a result of which the shaft is set in rotation. The energy supplied by the exhaust-gas flow to the shaft is used for driving the compressor which is likewise arranged on the shaft. The compressor conveys and compresses the charge air fed to it, as a result of which supercharging of the cylinders is obtained. A charge-air cooler may be provided in the intake system downstream of the compressor, by means of which charge-air cooler the compressed charge air is cooled before it enters the at least one cylinder. The cooler lowers the temperature and thereby increases the density of the charge air, such that the cooler also contributes to improved charging of the cylinders, that is to say to a greater air mass. In effect, compression by cooling takes place.

The advantage of an exhaust-gas turbocharger for example in comparison with a mechanical charger is that no mechanical connection for transmitting power is required between the charger and internal combustion engine. While a mechanical charger, that is to say compressor, extracts the energy required for driving it directly from the internal combustion engine, and thereby reduces the available power and thereby adversely affects the efficiency, the exhaust-gas turbocharger utilizes the exhaust-gas energy of the hot exhaust gases.

The advantage of a mechanically or electrically driven compressor is that the required charge pressure can be provided regardless of the operating state of the internal combustion engine.

Problems are encountered specifically in the configuration of the exhaust-gas turbocharging, wherein it is basically sought to obtain a noticeable performance increase in all engine speed ranges. In the case of internal combustion engines supercharged by way of exhaust-gas turbocharging, a torque drop is observed when a certain engine speed is undershot. The effect is undesirable and is thus also one of the most severe disadvantages of exhaust-gas turbocharging.

The torque drop is understandable if one takes into consideration that the charge pressure ratio is dependent on the turbine pressure ratio. For example, if the engine speed is reduced, this leads to a smaller exhaust-gas flow and therefore to a lower turbine pressure ratio. Consequently, toward lower engine speeds, the charge pressure ratio likewise decreases. This equates to a charge pressure drop or torque drop.

It may be desirable, using a variety of measures, to improve the torque characteristic of a supercharged internal combustion engine.

It is sought to do this for example by means of a small design of the turbine cross section and simultaneous exhaust-gas blow-off, wherein the exhaust-gas blow-off can be controlled by means of charge pressure or by means of exhaust-gas pressure. Such a turbine is also referred to as a wastegate turbine. If the exhaust-gas flow exceeds a critical value, a part of the exhaust-gas flow is conducted past the turbine via a bypass line during the course of the so-called exhaust-gas blow-off. The approach however has the disadvantage that the supercharging behavior is inadequate at relatively high engine speeds or in the case of relatively large exhaust-gas flows.

A turbine with variable turbine geometry permits, within certain limits, an adaptation of the turbine geometry or of the effective turbine cross section to the present exhaust-gas flow rate, such that regulation of the turbine geometry can be performed with regard to low and high rotational speeds or with regard to relatively low and relatively high exhaust-gas flow rates. As already mentioned, however, the turbine geometry can be adapted only within certain limits, and not to any desired extent.

The torque characteristic of a supercharged internal combustion engine can furthermore be improved through the use of multiple turbochargers, possibly in combination with one or more mechanically or electrically driveable compressors.

By connecting two exhaust-gas turbochargers in series, of which one exhaust-gas turbocharger serves as a high-pressure stage and one exhaust-gas turbocharger serves as a low-pressure stage, the combined compressor characteristic map can advantageously be expanded, specifically both in the direction of smaller compressor flows and also in the direction of larger compressor flows. An internal combustion engine of the type is described for example in the European patent application 1 640 596 A1.

In particular, in the case of the exhaust-gas turbocharger which serves as a high-pressure stage, it is possible for the surge limit to be shifted in the direction of smaller compressor flows, such that high charge pressure ratios can be obtained even with small compressor flows, whereby the torque characteristic in the lower part-load range is considerably improved. This is achieved by designing the high-pressure turbine for small exhaust-gas flows and by providing a bypass line by means of which, with increasing exhaust-gas flow, an increasing amount of exhaust gas is conducted past the high-pressure turbine. For this purpose, the bypass line branches off from the exhaust-gas discharge system upstream of the high-pressure turbine and opens into the exhaust-gas discharge system again downstream of the high-pressure turbine and upstream of the low-pressure turbine, wherein a control element is arranged in the bypass line in order to control the exhaust-gas flow conducted past the high-pressure turbine.

Two series-connected exhaust-gas turbochargers however also offer further advantages. The power boost through supercharging can be further increased. Furthermore, the response behavior of an internal combustion engine supercharged in this way is considerably improved—in particular in the part-load range—in relation to a similar internal combustion engine with an exhaust-gas turbocharger. The reason for this is that the relatively small high-pressure stage is less inert than a relatively large exhaust-gas turbocharger used for single-stage supercharging, because the rotor or impeller of an exhaust-gas turbocharger of smaller dimensions can accelerate and decelerate more quickly.

This also has advantages with regard to particle emissions. Because, during an acceleration, the required increase in the air mass supplied to the cylinders for the increased fuel flow rate takes place only with a delay owing to the inertia of the rotors, it is the case with a relatively small high-pressure turbocharger that the charge air is supplied to the engine virtually without a delay, and thus operating states with increased particle emissions are virtually eliminated.

Despite the advantages described, an internal combustion engine with two turbochargers arranged in series also has disadvantages, or further potential for improvement. Dense packaging of the supercharging arrangement has proven to be difficult to achieve. It is not possible for both turbines and both compressors to be arranged in a close-coupled position, such that a relatively complex and long line system must be provided both at the inlet side and at the outlet side.

By contrast to a compressor of an exhaust-gas turbocharger in which the close-coupled arrangement of the turbine generally has priority, a mechanically or electrically driven compressor can be easily arranged in a close-coupled position. This permits dense packaging of the supercharging arrangement and of the internal combustion engine.

The supercharged internal combustion engine to which the present application relates has at least two compressors arranged in series.

The second compressor, which is arranged downstream of the first compressor in the intake system, serves as a high-pressure stage or high-pressure compressor, and is equipped with a first bypass line which branches off from the intake system between the compressors and which opens into the intake system again downstream of the high-pressure compressor. A control element is arranged in the bypass line.

By virtue of the control element or the bypass line being opened, the internal combustion engine can be transferred from an operating mode with two-stage supercharging into an operating mode with single-stage supercharging, wherein the first compressor, which is also referred to as low-pressure stage, contributes to, or is used for, the supercharging in both modes.

According to the prior art, the regulation of the supercharging arrangement, in particular the actuation or the adjustment of the first control element and the drive of the compressors, is performed taking into consideration the charge pressure $p_{boost}$, which denotes the pressure in the intake system downstream of the second compressor and upstream of the inlet into the cylinders. Even if the regulation of the charge pressure $p_{boost}$ is performed in accordance with closed-loop regulation and feedback regulation is implemented, in the case of which the actual value of the charge pressure is compared with a predefinable setpoint value and the pressure difference $\Delta p$ is taken into consideration, the regulation according to the prior art exhibits low stability.

The cause for this can be seen in the fact that the two compressors influence one another. The pressure $p_{inter-stage}$ in the intake system between the compressors is duly determined significantly and directly by the first compressor, but the drive of the second compressor and the actuation of the first control element also have an influence on the pressure $p_{inter-stage}$ between the compressors. Also, the charge pressure $p_{boost}$ is duly determined significantly and directly by the second compressor but is also influenced by the pressure $p_{inter-stage}$ and thus by the first compressor.

In the case of two series-connected exhaust-gas turbochargers, it may for example be the case that an opening of the turbine geometry and/or of the bypass line of the high-pressure turbine for the purposes of reducing the charge pressure undesirably has the opposite effect, that is to say leads to an increase in the charge pressure, because the exhaust-gas energy that is utilized to a lesser extent at the high-pressure turbine is now available at the low-pressure turbine and, at the inlet side, serves to realize a higher pressure $p_{inter-stage}$ between the compressors, which leads, downstream, to an increase of the charge pressure.

In summary, it can be stated that, in the case of internal combustion engines with two compressors arranged in series, further measures are necessary in order to improve the regulation of the supercharging arrangement and thus the supercharging behavior.

Against this background, it is an object of the present application to specify a method for regulating the charge pressure $p_{boost}$, by way of which method the supercharging behavior of the internal combustion engine is improved, in particular with regard to the transition from multi-stage supercharging to single-stage supercharging and vice versa.

It is a further sub-object of the present application to provide a supercharged internal combustion engine for carrying out a method of the stated type.

The first sub-object is achieved by way of a method for regulating the charge pressure $p_{boost}$ of a supercharged internal combustion engine having at least one cylinder, having an intake system for the supply of charge air to the at least one cylinder, and having an exhaust-gas discharge system for the discharge of the exhaust gas from the at least one cylinder, and having at least two compressors arranged in series in the intake system, of which a first compressor serves as a low-pressure stage and a second compressor serves as a high-pressure stage, the second compressor being arranged downstream of the first compressor, a first bypass line being provided which branches off from the intake system between the first compressor and the second compressor and which opens into the intake system downstream of the second compressor, and a first control element being arranged in the first bypass line, which method is distinguished by the fact that a first setpoint value for the pressure $p_{inter-stage,set}$ in the intake system between the first compressor and the second compressor is predefined, the pressure $p_{inter-stage}$ in the intake system between the first compressor and the second compressor is determined, using the pressure difference $\Delta p_1 = p_{inter-stage,set} - p_{inter-stage}$, in a first regulation loop, the drive power of the first compressor is varied in order to regulate the pressure $p_{inter-stage}$, a second setpoint value for the pressure $p_{boost,\ set}$ in the intake system downstream of the second compressor is predefined, the pressure $p_{boost}$ in the intake system downstream of the second compressor is determined, and using the pressure difference $\Delta p_2 = p_{boost,\ set} - p_{boost}$, in a second regulation loop, the drive power of the second compressor is varied in order to regulate the pressure $p_{boost}$.

In the method according to the present application, the charge air pressures at two different locations in the intake system are determined and regulated independently of one another, specifically firstly the pressure $p_{inter-stage}$ between the compressors and secondly the charge pressure $p_{boost}$ downstream of the high-pressure compressor and upstream of the inlet into the at least one cylinder.

For the regulation of the charge pressure $p_{boost}$ of the internal combustion engine, a first setpoint value for the pressure $p_{inter-stage,set}$ between the compressors and a second setpoint value for the pressure $p_{boost,\ set}$ downstream of the high-pressure compressor are predefined.

Using the pressure difference $\Delta p_1 = p_{inter-stage,set} - p_{inter-stage}$, in a first regulation loop, the drive power of the first compressor is varied in order to regulate the pressure $p_{inter-stage}$, and using the pressure difference $\Delta p_2 = p_{boost,\ set} - p_{boost}$, in a second regulation loop, the drive power of the second compressor is varied in order to regulate the pressure $p_{boost}$. The two regulation loops are independent of one another.

The method according to the present application achieves the first object on which the present application is based, that is to say specifies a method for regulating the charge pressure $p_{boost}$, by way of which method the supercharging behavior of the internal combustion engine is improved, in particular with regard to the transition from multi-stage supercharging to single-stage supercharging and vice versa.

Further advantageous embodiments of the method according to the present application will be explained.

The different method variants make allowance in particular for the fact that an internal combustion engine equipped with at least two compressors arranged in series can be designed in a wide variety of ways; in particular, the compressors used may be mechanically or electrically driveable compressors or may be compressors of an exhaust-gas turbocharger, wherein the turbine of a turbocharger that is used may itself also be of various types of construction.

The three following method variants differ in terms of the type of construction of the first turbine of the first exhaust-gas turbocharger, which in the present case functions as a low-pressure stage. The first turbine may be in the form of a wastegate turbine with a bypass line in which a control element is arranged, and/or may be equipped with a variable turbine geometry. The various equipment features of the first turbine permit different method variants for the regulation of the charge pressure $p_{boost}$. In the present case, the second compressor is likewise the compressor of an exhaust-gas turbocharger, which functions as a high-pressure stage.

For the regulation of the charge pressure $p_{boost}$ of a supercharged internal combustion engine having at least two series-connected exhaust-gas turbochargers which each comprise a turbine arranged in the exhaust-gas discharge system and a compressor arranged in the intake system and of which a first exhaust-gas turbocharger serves as a low-pressure stage and a second exhaust-gas turbocharger serves as a high-pressure stage, in which the second turbine of the second exhaust-gas turbocharger is arranged upstream of the first turbine of the first exhaust-gas turbocharger, and the compressor of the second exhaust-gas turbocharger is the second compressor, which is arranged downstream of the compressor of the first exhaust-gas turbocharger, which is the first compressor, a second bypass line is provided which branches off from the exhaust-gas discharge system upstream of the second turbine and which opens into the exhaust-gas discharge system between the second turbine and the first turbine with the formation of a first junction point, a second control element being arranged in the second bypass line, and a third bypass line is provided which branches off from the exhaust-gas discharge system upstream of the first turbine between the first junction point and the first turbine and which opens into the exhaust-gas discharge system downstream of the first turbine, a third control element being arranged in the third bypass line, embodiments of the method are advantageous which are distinguished by the fact that using the pressure difference $\Delta p_1$, in a first regulation loop, the third control element is adjusted, whereby the drive power of the first compressor is varied in order to regulate the pressure $p_{inter-stage}$, and using the pressure difference $\Delta p_2$, in a second regulation loop, the second control element is adjusted, whereby the drive power of the second compressor is varied in order to regulate the pressure $p_{boost}$.

For the regulation of the charge pressure $p_{boost}$ of a supercharged internal combustion engine having at least two series-connected exhaust-gas turbochargers which each comprise a turbine arranged in the exhaust-gas discharge system and a compressor arranged in the intake system and of which a first exhaust-gas turbocharger serves as a low-pressure stage and a second exhaust-gas turbocharger serves as a high-pressure stage, in which the second turbine of the second exhaust-gas turbocharger is arranged upstream of the first turbine of the first exhaust-gas turbocharger, and the compressor of the second exhaust-gas turbocharger is the second compressor, which is arranged downstream of the compressor of the first exhaust-gas turbocharger, which is the first compressor, a second bypass line is provided which branches off from the exhaust-gas discharge system upstream of the second turbine and which opens into the exhaust-gas discharge system between the second turbine and the first turbine with the formation of a first junction point, a second control element being arranged in the second bypass line, embodiments of the method are advantageous which are distinguished by the fact that using the pressure difference $\Delta p_1$, in a first regulation loop, whereby the drive power of the first compressor is varied in order to regulate the pressure $p_{inter-stage}$, and using the pressure difference $\Delta p_2$, in a second regulation loop, the second control element is adjusted, whereby the drive power of the second compressor is varied in order to regulate the pressure $p_{boost}$.

For the regulation of the charge pressure $p_{boost}$ of a supercharged internal combustion engine having at least two series-connected exhaust-gas turbochargers which each comprise a turbine arranged in the exhaust-gas discharge system and a compressor arranged in the intake system and of which a first exhaust-gas turbocharger serves as a low-pressure stage and a second exhaust-gas turbocharger serves as a high-pressure stage, in which the second turbine of the second exhaust-gas turbocharger is arranged upstream of the first turbine of the first exhaust-gas turbocharger, and the compressor of the second exhaust-gas turbocharger is the second compressor, which is arranged downstream of the compressor of the first exhaust-gas turbocharger, which is the first compressor, a second bypass line is provided which branches off from the exhaust-gas discharge system upstream of the second turbine and which opens into the exhaust-gas discharge system between the second turbine and the first turbine with the formation of a first junction point, a second control element being arranged in the second bypass line, a third bypass line is provided which branches off from the exhaust-gas discharge system upstream of the first turbine between the first junction point and the first turbine and which opens into the exhaust-gas discharge system downstream of the first turbine, a third control element being arranged in the third bypass line, embodiments of the method are advantageous which are distinguished by the fact that using the pressure difference $\Delta p_1$, in a first regulation loop, the third control element of the first turbine is adjusted, whereby the drive power of the first compressor is varied in order to regulate the pressure $p_{inter-stage}$, and using the pressure difference $\Delta p_2$, in a second regulation loop, the second control element is adjusted, whereby the drive power of the second compressor is varied in order to regulate the pressure $p_{boost}$.

In this context, method variants are advantageous in which the pressure $p_{inter-stage}$ is increased by virtue of the third control element firstly being adjusted in the direction of a closed position, the third control element then being closed.

In the context of an increase of the pressure $p_{inter-stage}$, it is firstly the case that the wastegate, that is to say the third bypass line, is fully closed before the pressure is increased.

In this context, method variants are also advantageous in which the pressure $p_{inter-stage}$ is reduced by the third control element being adjusted in the direction of an open position.

In the context of a reduction of the pressure $p_{inter-stage}$, it is firstly the case that the variable turbine geometry of the first turbine is adjusted, that is to say opened, and then the wastegate, that is to say the third bypass line, is opened in order to further reduce the pressure.

The three following method variants make allowance for the fact that not only the type of construction of the first turbine of the first exhaust-gas turbocharger may vary, but rather the second turbine, which as a wastegate turbine has a bypass line, may be equipped with a variable turbine geometry. This equipment feature of the second turbine permits different method variants for the regulation of the charge pressure $p_{boost}$.

For the regulation of the charge pressure $p_{boost}$ of a supercharged internal combustion engine having at least two series-connected exhaust-gas turbochargers which each comprise a turbine arranged in the exhaust-gas discharge system and a compressor arranged in the intake system and of which a first exhaust-gas turbocharger serves as a low-pressure stage and a second exhaust-gas turbocharger serves as a high-pressure stage, in which the second turbine of the second exhaust-gas turbocharger is arranged upstream of the first turbine of the first exhaust-gas turbocharger, and the compressor of the second exhaust-gas turbocharger is the second compressor, which is arranged downstream of the compressor of the first exhaust-gas turbocharger, which is the first compressor, a second bypass line is provided which branches off from the exhaust-gas discharge system upstream of the second turbine and which opens into the exhaust-gas discharge system between the second turbine and the first turbine with the formation of a first junction point, a second control element being arranged in the second bypass line, a third bypass line is provided which branches off from the exhaust-gas discharge system upstream of the first turbine between the first junction point and the first turbine and which opens into the exhaust-gas discharge system downstream of the first turbine, a third control element being arranged in the third bypass line, and the second turbine is equipped with a variable turbine geometry (VNT$_2$), embodiments of the method are advantageous which are distinguished by the fact that using the pressure difference $\Delta p_1$, in a first regulation loop, the third control element is adjusted, whereby the drive power of the first compressor is varied in order to regulate the pressure $p_{inter-stage}$, and using the pressure difference $\Delta p_2$, in a second regulation loop, the second control element and/or the variable turbine geometry (VNT$_2$) of the second turbine is adjusted, whereby the drive power of the second compressor is varied in order to regulate the pressure $p_{boost}$.

For the regulation of the charge pressure $p_{boost}$ of a supercharged internal combustion engine having at least two series-connected exhaust-gas turbochargers which each comprise a turbine arranged in the exhaust-gas discharge system and a compressor arranged in the intake system and of which a first exhaust-gas turbocharger serves as a low-pressure stage and a second exhaust-gas turbocharger serves as a high-pressure stage, in which the second turbine of the second exhaust-gas turbocharger is arranged upstream of the first turbine of the first exhaust-gas turbocharger, and the compressor of the second exhaust-gas turbocharger is the second compressor, which is arranged downstream of the compressor of the first exhaust-gas turbocharger, which is the first compressor, a second bypass line is provided which branches off from the exhaust-gas discharge system upstream of the second turbine and which opens into the exhaust-gas discharge system between the second turbine and the first turbine with the formation of a first junction point, a second control element being arranged in the second bypass line, and the second turbine is equipped with a variable turbine geometry (VNT$_2$), embodiments of the method are advantageous which are distinguished by the fact that using the pressure difference $\Delta p_1$, in a first regulation loop the drive power of the first compressor is varied in order to regulate the pressure $p_{inter-stage}$, and using the pressure difference $\Delta p_2$, in a second regulation loop, the second control element and/or the variable turbine geometry (VNT$_2$) of the second turbine is adjusted, whereby the drive power of the second compressor is varied in order to regulate the pressure $p_{boost}$.

For the regulation of the charge pressure $p_{boost}$ of a supercharged internal combustion engine having at least two series-connected exhaust-gas turbochargers which each comprise a turbine arranged in the exhaust-gas discharge system and a compressor arranged in the intake system and of which a first exhaust-gas turbocharger serves as a low-pressure stage and a second exhaust-gas turbocharger serves as a high-pressure stage, in which the second turbine of the second exhaust-gas turbocharger is arranged upstream of the first turbine of the first exhaust-gas turbocharger, and the compressor of the second exhaust-gas turbocharger is the second compressor, which is arranged downstream of the compressor of the first exhaust-gas turbocharger, which is the first compressor, a second bypass line is provided which branches off from the exhaust-gas discharge system upstream of the second turbine and which opens into the exhaust-gas discharge system between the second turbine and the first turbine with the formation of a first junction point, a second control element being arranged in the second bypass line, a third bypass line is provided which branches off from the exhaust-gas discharge system upstream of the first turbine between the first junction point and the first turbine and which opens into the exhaust-gas discharge system downstream of the first turbine, a third control element being arranged in the third bypass line, and the second turbine is equipped with a variable turbine geometry (VNT$_2$), embodiments of the method are advantageous which are distinguished by the fact that using the pressure difference $\Delta p_1$, in a first regulation loop, the third control element of the first turbine is adjusted, whereby the drive power of the first compressor is varied in order to regulate the pressure $p_{inter-stage}$, and using the pressure difference $\Delta p_2$, in a second regulation loop, the second control element and/or the variable turbine geometry (VNT$_2$) of the second turbine is adjusted, whereby the drive power of the second compressor is varied in order to regulate the pressure $p_{boost}$.

If the second turbine is equipped with a variable turbine geometry (VNT$_2$), embodiments of the method may be advantageous in which the pressure $p_{boost}$ is increased by virtue of the second control element firstly being adjusted in the direction of a closed position, the second control element then being closed, and the variable turbine geometry (VNT$_2$) of the second turbine subsequently being adjusted in the direction of a closed position.

If the second turbine is equipped with a variable turbine geometry (VNT$_2$), embodiments of the method may be advantageous in which the pressure $p_{boost}$ is reduced by virtue of the variable turbine geometry (VNT$_2$) of the second turbine firstly being adjusted in the direction of an open position, and the second control element subsequently being adjusted in the direction of an open position.

Method variants are advantageous in which, proceeding from a first operating mode with two-stage supercharging, the internal combustion engine is, with increasing exhaust-gas flow rate, transferred into a second operating mode with single-stage supercharging, for which purpose the first control element is opened for the purposes of deactivating the second compressor, and the second control element is opened for the purposes of deactivating the second turbine.

For the regulation of the charge pressure $p_{boost}$ of a supercharged internal combustion engine, in which the second turbine is equipped with a variable turbine geometry ($VNT_2$), embodiments of the method may, in this context, be advantageous which are distinguished by the fact that the variable turbine geometry ($VNT_2$) of the second turbine is adjusted in the direction of an open position when the internal combustion engine is transferred into the second operating mode with single-stage supercharging.

In this context, embodiments of the method are also advantageous in which the transfer from the first operating mode with two-stage supercharging into the second operating mode with single-stage supercharging takes place as soon as the first compressor is generating the predominant fraction of the charge pressure $p_{boost}$.

Embodiments of the method are advantageous in which the pressure $p_{inter-stage}$ and/or the pressure $p_{boost}$ is determined by virtue of the pressure $p_{inter-stage}$ and/or the pressure $p_{boost}$ being detected by measurement by way of a sensor.

Embodiments of the method may however also be advantageous in which the pressure $p_{inter-stage}$ and/or the pressure $p_{boost}$ is determined by virtue of the pressure $p_{inter-stage}$ and/or the pressure $p_{boost}$ being determined by simulation calculation.

The second sub-object on which the present application is based, specifically that of providing a supercharged internal combustion engine for carrying out a method of an above-described type, is achieved by way of a supercharged internal combustion engine having at least one cylinder, having an intake system for the supply of charge air to the at least one cylinder, and having an exhaust-gas discharge system for the discharge of the exhaust gas from the at least one cylinder, and having at least two compressors arranged in series in the intake system, of which a first compressor serves as a low-pressure stage and a second compressor serves as a high-pressure stage, the second compressor being arranged downstream of the first compressor, a first bypass line being provided which branches off from the intake system between the first compressor and the second compressor and which opens into the intake system downstream of the second compressor, and a first control element being arranged in the first bypass line, which internal combustion engine is distinguished by the fact that, for the detection by measurement of the pressure $p_{inter-stage}$, a first sensor is provided in the intake system between the first compressor and the second compressor, and for the detection by measurement of the pressure $p_{boost}$, a second sensor is provided in the intake system downstream of the second compressor.

That which has been stated in conjunction with the method according to the present application likewise applies to the internal combustion engine according to the present application.

Embodiments of the supercharged internal combustion engine having at least two series-connected exhaust-gas turbochargers which each comprise a turbine arranged in the exhaust-gas discharge system and a compressor arranged in the intake system, and of which a first exhaust-gas turbocharger serves as a low-pressure stage and a second exhaust-gas turbocharger serves as a high-pressure stage, are advantageous which are distinguished by the fact that the second turbine of the second exhaust-gas turbocharger is arranged upstream of the first turbine of the first exhaust-gas turbocharger, and the compressor of the second exhaust-gas turbocharger is the second compressor, which is arranged downstream of the compressor of the first exhaust-gas turbocharger, which is the first compressor, a second bypass line is provided which branches off from the exhaust-gas discharge system upstream of the second turbine and which opens into the exhaust-gas discharge system between the second turbine and the first turbine with the formation of a first junction point, a second control element being arranged in the second bypass line, a third bypass line is provided which branches off from the exhaust-gas discharge system upstream of the first turbine between the first junction point and the first turbine and which opens into the exhaust-gas discharge system downstream of the first turbine, a third control element being arranged in the third bypass line, and the second turbine is equipped with a variable turbine geometry ($VNT_2$).

In this connection, embodiments of the supercharged internal combustion engine are advantageous in which the first turbine is equipped with a variable turbine geometry ($VNT_1$).

Embodiments of the supercharged internal combustion engine are advantageous in which the first control element is actively controllable. The first control element may basically also be in the form of a passive on/off valve. It is however more advantageous if the first control element is actively controllable, that is to say actively opened and closed. The first control element may for example be in the form of a valve which is acted on with a vacuum, wherein, by way of an electromagnetic valve, the applied vacuum, and thus the switching position of the control element, are influenced.

FIG. 1 schematically shows a first embodiment of the supercharged internal combustion engine 1, based on the example of a six-cylinder V-configuration engine. The cylinders 3 of the internal combustion engine 1 are arranged on two cylinder banks and have exhaust lines for the discharging of the hot combustion gases via an exhaust-gas discharge system 4. All of the exhaust lines or cylinders 3 are connected to one another via the exhaust-gas discharge system 4, and the same exhaust-gas pressure prevails in all of the exhaust lines. Furthermore, the internal combustion engine 1 has an intake system 2 for the supply of charge air to the cylinders 3.

The internal combustion engine 1 is, for supercharging purposes, equipped with two series-connected exhaust-gas turbochargers 6, 7 which each comprise a turbine 6a, 7a arranged in the exhaust-gas discharge system 4 and a compressor 6b, 7b arranged in the intake system 2 and of which a first exhaust-gas turbocharger 6 serves as a low-pressure stage 6 and a second exhaust-gas turbocharger 7 serves as a high-pressure stage 7.

The second turbine 7a of the second exhaust-gas turbocharger 7 is arranged upstream of the first turbine 6a of the first exhaust-gas turbocharger 6, and the second compressor 7b of the second exhaust-gas turbocharger 7 is arranged downstream of the first compressor 6b of the first exhaust-gas turbocharger 6.

A first bypass line 10 branches off from the intake system 2 between the first compressor 6b and the second compressor 7b and opens into the intake system 2 downstream of the second compressor 7b. A first control element 11 is arranged in the first bypass line 10. The first control element 11 is opened, for the purposes of deactivating the second compressor 7b, if the internal combustion engine 1 is transferred from a first operating mode with two-stage supercharging into a second operating mode with single-stage supercharging.

For this purpose, it is also the case that, for the purposes of deactivating the second turbine 7a, a second control element 13 is opened, the latter being arranged in a second bypass line 12 which branches off from the exhaust-gas discharge system 4 upstream of the second turbine 7a and which opens into the exhaust-gas discharge system 4, with the formation of a first junction point 9a, between the second turbine 7a and the first turbine 6a. Furthermore, the second turbine 7a is equipped with a variable turbine geometry (see arrow).

The first turbine 6a is likewise in the form of a wastegate turbine, and has a third bypass line 14 which branches off from the exhaust-gas discharge system 4, with the formation of a second junction point 9b, upstream of the first turbine 6a between the first junction point 9a and the first turbine 6a and which opens into the exhaust-gas discharge system 4 again downstream of the first turbine 6a. A third control element 15 is arranged in the third bypass line 14.

The charge air supplied to the internal combustion engine 1 can thus be compressed in single-stage or two-stage fashion.

A charge-air cooler 5 is arranged in the intake system 2 downstream of the compressors 6b, 7b. The charge-air cooler 5 lowers the air temperature and thereby increases the density of the charge air, as a result of which the cooler contributes to improved charging of the cylinders 3 with air.

In the embodiment illustrated in FIG. 1, for the detection of the charge-air pressure by measurement, two sensors 8a, 8b are provided at different locations in the intake system 2.

At the outlet of the low-pressure compressor 6b there is arranged a first sensor 8a for determining, that is to say detecting by measurement, the pressure $p_{inter\text{-}stage}$ between the compressors 6b, 7b. A second sensor 8b downstream of the second compressor 7b and downstream of the charge-air cooler 5 serves for the detection, by measurement, of the charge pressure $p_{boost}$ upstream of the inlet into the cylinders 3.

For the regulation of the charge pressure $p_{boost}$ of the internal combustion engine 1, a first setpoint value for the pressure $p_{inter\text{-}stage,set}$ between the compressors 6b, 7b and a second setpoint value for the pressure $p_{boost,\ set}$ downstream of the charge-air cooler 5 are predefined.

Using the pressure difference $\Delta p_1 = p_{inter\text{-}stage,set} - p_{inter\text{-}stage}$, in a first regulation loop, the drive power of the first compressor 6b is varied in order to regulate the pressure $p_{inter\text{-}stage}$. By adjustment of the third control element 15, the exhaust-gas flow rate that is blown off and conducted past the low-pressure turbine 6a is adjusted in order to vary the drive power of the first compressor 6b and regulate the pressure $p_{inter\text{-}stage}$.

Using the pressure difference $\Delta p_2 = p_{boost,\ set} - p_{boost}$, in a second regulation loop, the drive power of the second compressor 7b is varied in order to regulate the pressure $p_{boost}$. By adjustment of the second control element 13 and/or by adjustment of the variable turbine geometry of the second turbine 7a, the drive power of the second compressor 7b is varied and the charge pressure $p_{boost}$ is regulated. The two regulation loops are independent of one another.

The engine system may further include a control system. The control system may include a controller 112 in combination with various sensors and actuators of the engine system. The controller 112 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 112 may receive various signals from sensors coupled to engine 1, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor. Engine speed signal, RPM, may be generated by controller 112 from signal PIP.

Storage medium read-only memory 106 can be programmed with computer readable data representing instructions executable by processor 102 for performing the methods described below as well as other variants that are anticipated but not specifically listed. Example methods are described with reference to FIG. 2.

The controller 112 receives signals from the various sensors of FIG. 1 and employs the various actuators of FIG. 1 to adjust engine operation based on the received signals and instructions stored on a memory of the controller. For example, the controller may receive signals from various sensors indicating engine speed and load, and the controller may adjust one or more actuators each associated with a respective cylinder (e.g., exhaust valve actuators, intake valve actuators, fuel injectors) based on the received signals.

Figure 2:
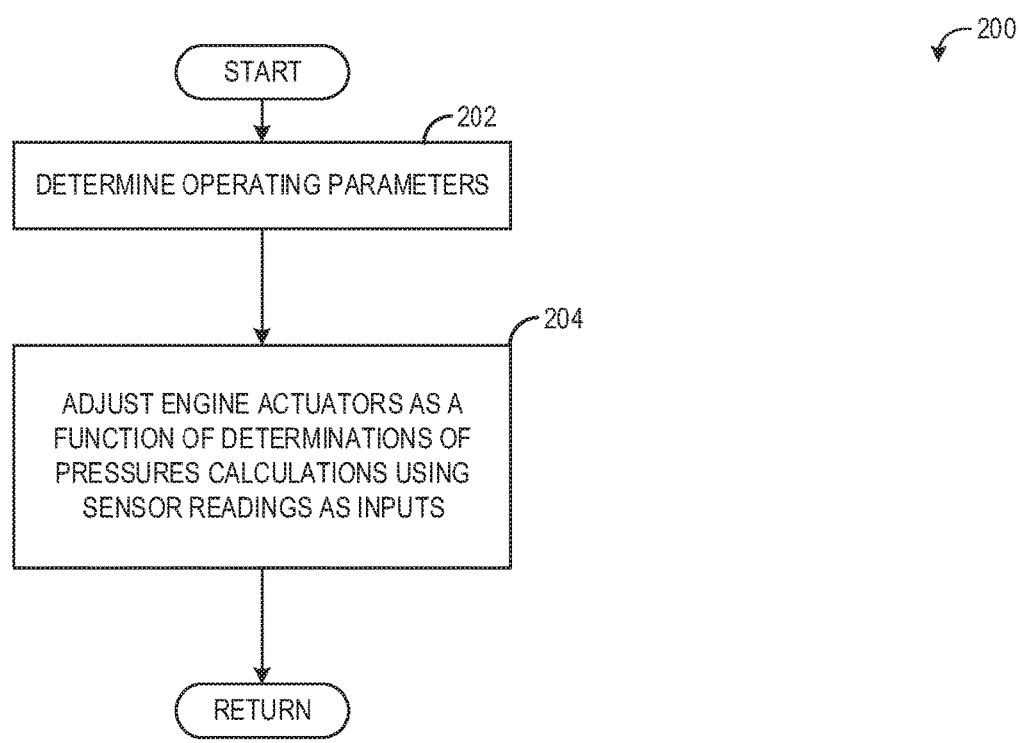
FIG. 2 shows an example method of operation.

FIG. 2 shows a method of operation that may be carried out via the control system of FIG. 1 using the determinations described herein. FIG. 2 is a flow chart illustrating a method 200 for operating an engine, such as the engine 10 of FIG. 1. Instructions for carrying out method 200 and the rest of the methods described herein may be executed by a controller based on instructions stored on a memory of the controller (e.g., controller 112) and in conjunction with signals received from sensors of the engine system, such as the sensors described above with reference to FIG. 1. The controller may employ engine actuators of the engine system to adjust engine operation, according to the methods described below.

At 202, method 200 includes determining operating parameters. The determined operating parameters may include engine speed, engine load, aftertreatment device temperature, charge pressure, and other suitable parameters as described herein, for example by reading sensor values. At 204, method 200 determines adjustment outputs to actuators of the engine, such as wastegate positions of the various turbochargers, EGR valve positions, and positions of vanes of the variable geometry turbocharger, for example. Block 204 may utilize the various operation described above herein for controlling boost pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

REFERENCE DESIGNATIONS

1 Supercharged internal combustion engine
2 Intake system
3 Cylinder
4 Exhaust-gas discharge system
5 Charge-air cooler
6 First exhaust-gas turbocharger, low-pressure stage
6a First turbine
6b First compressor
7 Second exhaust-gas turbocharger, high-pressure stage
7a Second turbine
7b Second compressor
8a First sensor, sensor for determining $p_{inter-stage}$
8b Second sensor, sensor for determining $p_{boost}$
9a First junction point
9b Second junction point
10 First bypass line
11 First control element
12 Second bypass line
13 Control element
14 Third bypass line
15 Control element

| | |
|---|---|
| $P_{boost}$ | Charge pressure, pressure in the intake system downstream of the second compressor. |
| $P_{boost,set}$ | Second setpoint value, setpoint value for the pressure downstream of the second compressor. |
| $P_{inter-stage}$ | Pressure in the intake system between the compressors. |
| $P_{inter-stage,set}$ | First setpoint value, setpoint value for the pressure between the compressors. |

The invention claimed is:

1. A method of regulating a charge pressure $P_{boost}$ of a supercharged internal combustion engine having:
   at least one cylinder;
   an intake system for the supply of charge air to the at least one cylinder;
   an exhaust-gas discharge system for the discharge of the exhaust gas from the at least one cylinder;
   at least two series-connected exhaust-gas turbochargers including a low-pressure exhaust gas turbochargers and a high-pressure exhaust gas turbocharger; with the low-pressure exhaust gas turbocharger including a low-pressure compressor connected to a low-pressure turbine;
   wherein the high-pressure exhaust gas turbocharger includes a high-pressure compressor connected to a high-pressure turbine;
   wherein the high-pressure compressor of the at least two series-connected exhaust-gas turbochargers is arranged downstream of the low-pressure compressor in an intake system to supply charge air to the at least one cylinder;
   a first bypass line branching off from the intake system at a point downstream of the low-pressure compressor and upstream of the high-pressure compressor, and opening into the intake system downstream of the high-pressure compressor;
   a first control element being arranged in the first bypass line;
   and
   first sensor and second sensors in the intake system;
      wherein the first sensor is positioned at the point downstream of the low-pressure compressor and upstream of the high-pressure compressor to detect an actual inter-stage pressure $p_{inter-stage}$; and
      wherein the second sensor is positioned at downstream of the high-pressure compressor to detect an actual boost pressure $p_{boost}$;
   the method comprising:
      with a controller,
         predefining an inter-stage pressure setpoint value $p_{inter-stage,\ set}$ in the intake system between the low-pressure compressor and the high-pressure compressor;
         predefining a boost pressure setpoint value $p_{boost,\ set}$ in the intake system at downstream of the high-pressure compressor;
         adjusting a drive power of the low-pressure compressor to regulate the actual inter-stage pressure $p_{inter-stage}$ responsive to a pressure difference $\Delta p_1$ between the inter-stage pressure setpoint value $p_{inter-stage,\ set}$ and the actual inter-stage pressure $p_{inter-stage}$ via controlling the first control element; and
         adjusting a drive power of the high-pressure compressor to regulate the actual boost pressure $p_{boost}$ responsive to a pressure difference $\Delta p_2$ between the boost pressure setpoint value $p_{boost,\ set}$ and the actual boost pressure $p_{boost}$ via varying a drive power of the high-pressure compressor is to regulate the actual boost pressure $p_{boost}$ via controlling the first control element.

2. The method as recited in claim 1 of regulating the charge pressure $p_{boost}$ of the supercharged internal combustion engine further including:
   a second bypass line branching off from the exhaust-gas discharge system upstream of the high-pressure turbine and opening into the exhaust-gas discharge system at a first junction point downstream of the high-pressure turbine and upstream of the low-pressure turbine, and a second control element being arranged in the second bypass line; and a third bypass line branching off from the exhaust-gas discharge system upstream of the low-pressure turbine between the first junction point and the low-pressure turbine and opening into the exhaust-gas discharge system downstream of the low-pressure turbine; and a third control element being arranged in the third bypass line;

the method further comprising:
via the controller,
adjusting the third control element based on the pressure difference $\Delta p_1$ between the inter-stage pressure setpoint value $p_{inter\text{-}stage,\,set}$ and the actual inter-stage pressure $P_{inter\text{-}stage}$ to vary the drive power of the low-pressure compressor and to regulate the actual inter-stage pressure $p_{inter\text{-}stage}$; and adjusting the second control element based on the pressure difference $\Delta p_2$ between the boost pressure setpoint value $p_{boost,\,set}$ and the actual boost pressure $P_{boost}$ to vary the drive power of the high-pressure compressor and to regulate the actual boost pressure $p_{boost}$.

3. The method as recited in claim 1 of regulating the charge pressure $p_{boost}$ of the supercharged internal combustion engine further including:

a second bypass line branching off from the exhaust-gas discharge system upstream of the high-pressure turbine and opening into the exhaust-gas discharge system at a first junction point downstream of the high-pressure turbine and upstream of the low-pressure turbine, and a second control element being arranged in the second bypass line;

a third bypass line branching off from the exhaust-gas discharge system upstream of the low-pressure turbine between the first junction point and the low-pressure turbine and opening into the exhaust-gas discharge system downstream of the low-pressure turbine; and a third control element being arranged in the third bypass line; and wherein the high-pressure turbine is equipped with a variable turbine geometry ($VNT_2$);

the method further comprising:
via the controller,
adjusting the third control element based on the pressure difference $\Delta p_1$ between the inter-stage pressure setpoint value $p_{inter\text{-}stage,\,set}$ and the actual inter-stage pressure $p_{inter\text{-}stage}$ to vary the drive power of the low-pressure compressor and to regulate the actual inter-stage pressure $p_{inter\text{-}stage}$; and the pressure difference $\Delta p_2$ between the boost pressure setpoint value $p_{boost,\,set}$ and the actual boost pressure $p_{boost}$ to vary the drive power of the high-pressure compressor and to regulate the actual boost pressure $p_{boost}$.

4. The method as recited in claim 1, of regulating the charge pressure $p_{boost}$ of a supercharged internal combustion engine further including:

a second bypass line branching off from the exhaust-gas discharge system upstream of the high-pressure turbine and opening into the exhaust-gas discharge system at a first junction point downstream of the high-pressure turbine and upstream of the low-pressure turbine; and a second control element being arranged in the second bypass line; and a third bypass line branching off from the exhaust-gas discharge system upstream of the low-pressure turbine between the first junction point and the low-pressure turbine, and opening into the exhaust-gas discharge system downstream of the low-pressure turbine; and a third control element being arranged in the third bypass line;

the second turbine being equipped with a variable turbine geometry ($VNT_2$);

the method further comprising:
via the controller,
adjusting the third control element based on the pressure difference $\Delta p_1$ between the inter-stage pressure setpoint value $p_{inter\text{-}stage,\,set}$ and the actual inter-stage pressure $p_{inter\text{-}stage}$ to vary the drive power of the low-pressure compressor and to regulate the actual inter-stage pressure $p_{inter\text{-}stage}$; and adjusting at least one of the second control element and the variable turbine geometry ($VNT_2$) of the high-pressure turbine based on the pressure difference $\Delta p_2$ between the boost pressure setpoint value $p_{boost,\,set}$ and the actual boost pressure $p_{boost}$ to vary the drive power of the high-pressure compressor and to regulate the actual boost pressure $p_{boost}$.

5. The method as recited in claim 4, wherein the charge pressure $p_{boost}$ is increased by virtue of closing the second control element and subsequently adjusting the variable turbine geometry ($VNT_2$) of the high-pressure turbine toward a closed position via the controller.

6. The method as recited in claim 5, wherein the charge pressure $p_{boost}$ is reduced by virtue of the variable turbine geometry ($VNT_2$) of the high-pressure turbine being adjusted in a direction of an open position, and subsequently adjusting the second control element toward an open position via the controller.

7. The method as recited in claim 6, further comprising:
via the controller,
during a mode change of the supercharged internal combustion engine from a first operating mode with two stage supercharging into a second operating mode with single-stage supercharging,
deactivating the high-pressure compressor via opening the first control element; and
deactivating the high-pressure turbine via opening the second control element.

8. The method as recited in claim 7, of regulating the charge pressure $p_{boost}$ of the supercharged internal combustion engine in which the high-pressure turbine is equipped with the variable turbine geometry ($VNT_2$);
further comprising:
via the controller,
adjusting the variable turbine geometry ($VNT_2$) of the high-pressure turbine to is adjusted to the open position when the internal combustion engine is transferred from the first operating mode with the two stage supercharging into the second operating mode with the single-stage supercharging.

9. A supercharged internal combustion engine, comprising:
at least one cylinder;
an intake system for the supply of charge air to the at least one cylinder;
an exhaust-gas discharge system for the discharge of the exhaust gas from the at least one cylinder;
at least two series-connected exhaust-gas turbochargers including a low-pressure exhaust gas turbochargers and a high-pressure exhaust gas turbocharger;

wherein the low-pressure exhaust gas turbocharger includes a low-pressure compressor connected to a low-pressure turbine;

wherein the high-pressure exhaust gas turbocharger includes a high-pressure compressor connected to a high-pressure turbine; and wherein the high-pressure compressor of the at least two series-connected exhaust-gas turbochargers is arranged downstream of the low-pressure compressor in an intake system;

a first bypass line branching off from the intake system at a point downstream of the low-pressure compressor and upstream of the high-pressure compressor, and opening into the intake system downstream of the high-pressure compressor;

a first control element being arranged in the first bypass line;

a second bypass line branching off from the exhaust-gas discharge system upstream of the high-pressure turbine and opening into the exhaust-gas discharge system at a first junction point downstream of the high-pressure turbine and upstream of the low-pressure turbine;

a second control element being arranged in the second bypass line;

first and second sensors in the intake system;

wherein the first sensor is positioned at the point downstream of the low-pressure compressor and upstream of the high-pressure compressor to detect an actual inter-stage pressure $p_{inter\text{-}stage}$; and wherein the second sensor is positioned at downstream of the high-pressure compressor to detect an actual boost pressure $p_{boost}$; and a controller including executable instructions stored in an electronic medium to:

during a mode chance of the supercharged internal combustion engine from a first operating mode with two stage supercharging into a second operating mode with single-stage supercharging, deactivating the high-pressure compressor via opening the first control element; and deactivating the high-pressure turbine via opening the second control element; and additional executable instructions to adjust each of a first wastegate and a second wastegate, a variable turbine geometry ($VNT_2$), and a downstream compressor bypass valve to regulate engine boost pressure as a function of a first setpoint value $p_{inter\text{-}stage,\ set}$ for a pressure between the high-pressure compressor and the low-pressure compressor, a pressure difference $\Delta p_1$ between the first setpoint value $p_{inter\text{-}stage,\ set}$ and an actual inter-stage pressure $p_{inter\text{-}stage}$, a boost pressure setpoint value $p_{boost,\ set}$ for a pressure downstream of the high-pressure compressor, and a pressure difference $\Delta p_2$ between the boost pressure setpoint $p_{boost,\ set}$ and an actual boost pressure $p_{boost}$.

10. The supercharged internal combustion engine as recited in claim 9, further comprising:

a third bypass line branching off from the exhaust-gas discharge system upstream of the low-pressure turbine between the first junction point and the low-pressure turbine, and opening into the exhaust-gas discharge system downstream of the low-pressure turbine; and a third control element arranged in the third bypass line;

wherein the high-pressure turbine is equipped with the variable turbine geometry ($VNT_2$).

* * * * *